(12) United States Patent
Bates et al.

(10) Patent No.: US 7,730,119 B2
(45) Date of Patent: Jun. 1, 2010

(54) SUB-TASK PROCESSOR DISTRIBUTION SCHEDULING

(75) Inventors: John P. Bates, Redwood City, CA (US); Payton R. White, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 955 days.

(21) Appl. No.: 11/459,301

(22) Filed: Jul. 21, 2006

(65) Prior Publication Data

US 2008/0021987 A1  Jan. 24, 2008

(51) Int. Cl.
*G06F 15/16* (2006.01)

(52) U.S. Cl. .............. 709/201; 709/202; 709/226; 709/232

(58) Field of Classification Search ......... 709/201, 709/202, 226, 232
See application file for complete search history.

(56) References Cited

U.S. PATENT DOCUMENTS

| | | | | |
|---|---|---|---|---|
| 5,031,089 A * | 7/1991 | Liu et al. | ............... | 709/226 |
| 5,414,849 A | 5/1995 | Yamamoto | | |
| 6,009,455 A * | 12/1999 | Doyle | ............... | 709/201 |
| 6,112,225 A * | 8/2000 | Kraft et al. | ............... | 709/202 |
| 7,346,906 B2 * | 3/2008 | Kelly et al. | ............... | 718/105 |
| 7,376,693 B2 * | 5/2008 | Neiman et al. | ............... | 709/201 |
| 7,467,180 B2 * | 12/2008 | Kaufman et al. | ............... | 709/201 |
| 2003/0005068 A1 * | 1/2003 | Nickel et al. | ............... | 709/208 |
| 2003/0177240 A1 * | 9/2003 | Gulko et al. | ............... | 709/226 |
| 2003/0237084 A1 * | 12/2003 | Neiman et al. | ............... | 718/102 |
| 2006/0070078 A1 * | 3/2006 | Dweck et al. | ............... | 718/104 |
| 2007/0088828 A1 * | 4/2007 | Inampudi et al. | ............ | 709/226 |
| 2007/0260669 A1 * | 11/2007 | Neiman et al. | ............. | 709/201 |
| 2007/0288638 A1 * | 12/2007 | Vuong et al. | ............... | 709/226 |

FOREIGN PATENT DOCUMENTS

| | | |
|---|---|---|
| JP | 06-139212 | 5/1994 |
| JP | 09-129867 | 5/1997 |
| JP | 11-039271 | 2/1999 |
| JP | 2001-325041 | 11/2001 |
| JP | 2004-038226 | 2/2004 |

OTHER PUBLICATIONS

Daniel Andresen et al., entitled "An evaluation of distributed scheduling algorithms within the DESPOT architecture", 7 pages. 2004.
Dayi Zhou et al., entitled "Cluster Computing on the Fly: Resource Discovery in a Cycle Sharing Peer-to-Peer System", Apr. 2004, 8 pages.
"Notification of Reasons for Refusal" for Japanese Patent Application No. 2007-184406 dated Aug. 7, 2009, 4 pages.
Lisa Cingiser DiPippo et al., entitled "Chapter 1 Global Scheduling and Binding in a Real-Time Embedded Distributed System", Conference Proceeding, Jul. 2002, 1 page.
Adriana Iamnitchi et al., entitled "A Peer-To-Peer Approach to Resource Location in Grid Environments", Peer-to-Peer Resource Location in Grids, 2003, 25 pages.

* cited by examiner

*Primary Examiner*—Phuoc Nguyen
(74) *Attorney, Agent, or Firm*—Joshua D. Isenberg; JDI Patent (57) ABSTRACT

A method for processing of processor executable tasks and a processor readable medium having embodied therein processor executable instructions for implementing the method are disclosed. A system for distributing processing work amongst a plurality of distributed processors is also disclosed.

32 Claims, 4 Drawing Sheets

SUB-TASK PROCESSOR DISTRIBUTION SCHEDULING

FIELD OF THE INVENTION

Embodiments of the present invention are related to distributed computing and more particularly to distribution of computing tasks among multiple processors.

BACKGROUND OF THE INVENTION

A major advance in electronic computation has been the development of systems that can perform multiple operations simultaneously. Such systems are said to perform parallel processing. Many computation tasks can be regarded as interdependent sub-tasks. Often, some of these sub-tasks may be implemented by parallel processing by distributing the tasks amongst local or remote processors.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
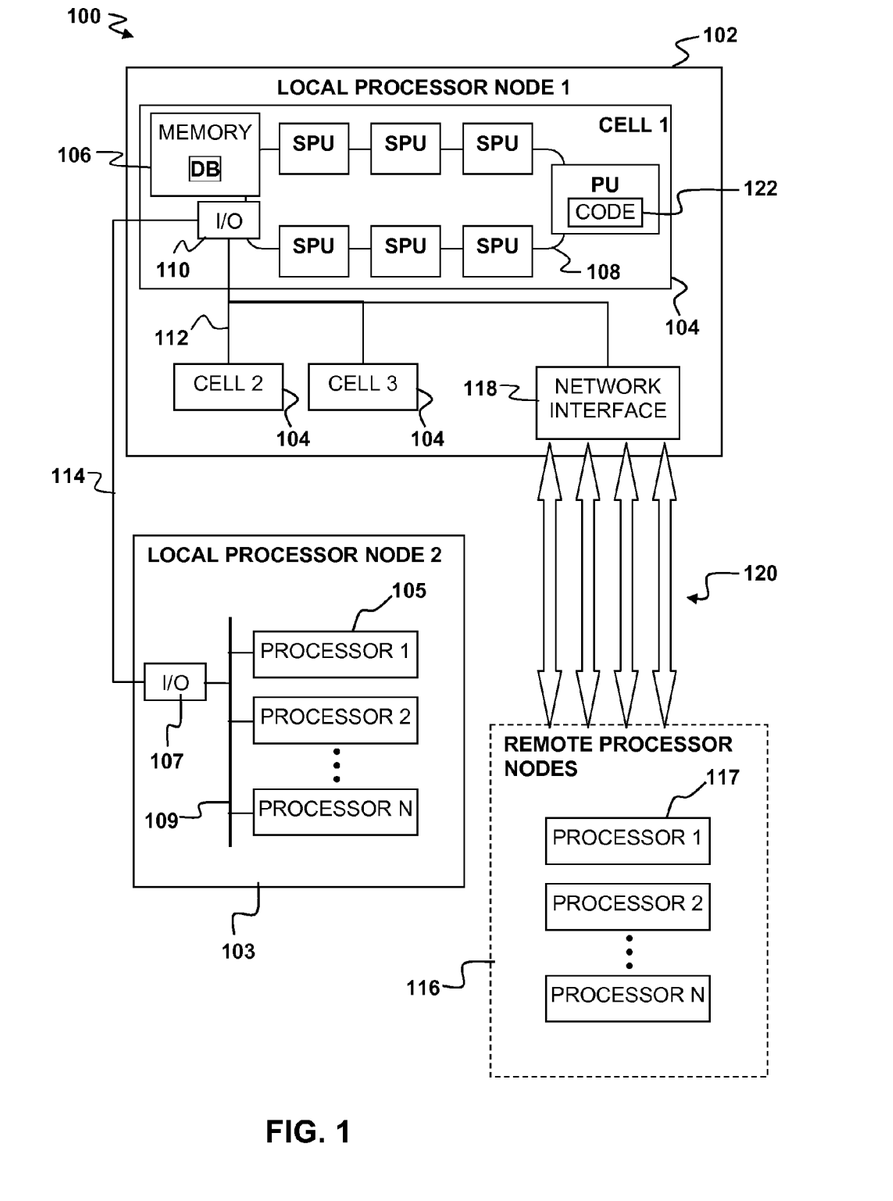
FIG. 1 is a block diagram of a distributed processing system according to an embodiment of the present invention.
Figure 2:
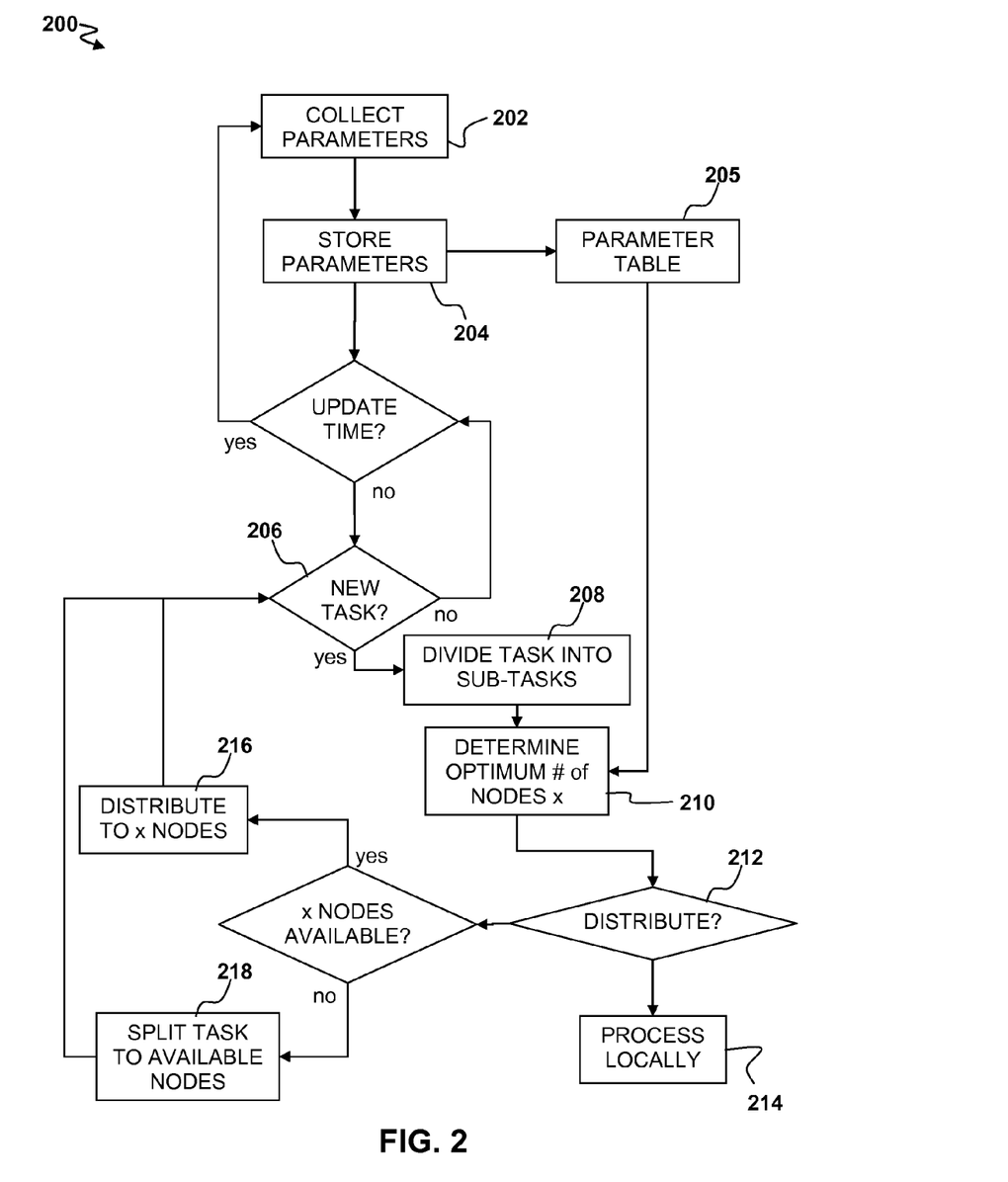
FIG. 2 is a flow diagram of a method according to an embodiment of the present invention.

Embodiments of the present invention may be understood by reference to FIG. 1 and FIG. 2. FIG. 1 depicts an example of s system 100 that may implement embodiments of the present invention. FIG. 2 depicts a flow diagram of a method 200 that may be implemented, e.g., using the system 100 of FIG. 1. The system 100 generally includes a local processor node 102 that is operably coupled to one or more other processors referred to herein as distributed nodes. The processor node 102 generally includes one or more individual processor units 104 and may include a memory 106. By way of example, and without loss of generality, the processor units 104 may include one or more cell processor units. Each cell processor unit may include a power processing unit PU and one or more synergistic processor units SPU. Each SPU may have an associated local memory. Each of the processor units 104 may be regarded as a node. Similarly, each of the processor elements within a processor unit 104, e.g., the PU and SPUs may be regarded as nodes. The PU and SPUs may be connected to each other through a bus 108.

The processor unit 104 may exchange data and/or instructions with locally distributed nodes such as other processor units 104 within the local node 102, e.g., through an input/output (I/O) element 110 and a data bus 112 sometimes referred to as a "blade". The processor units 104 may communicate with other locally distributed processor nodes 103 through the I/O element 110 and a local data bus 114, such as a peripheral component interconnect (PCI) or PCI express (PCIE) data bus. The local processor nodes 103 may include multiple processor units 105, an I/O element 107 and internal data bus 109. The processor units 104 in the local processor node 102 may communicate with remotely distributed processor nodes 116 via a network interface 118 coupled to the I/O element 110 and one or more networks 120. Each remotely distributed processor node 116 may include multiple processors 117, which may be configured as described above.

The networks 120 may include one or more local area networks and/or one or more wide area networks. As used herein, a local area network (LAN) refers to a computer network that spans a relatively small area, e.g., a single building or group of buildings. Each node (individual device) in a LAN typically has one or more processors with which it executes programs. Each node may also be able to access data and devices anywhere on the LAN. A LAN may be connected to other LANs over any distance, e.g., via telephone lines or radio waves. A system of LANs connected in this way is referred to as a wide-area network (WAN). The Internet is an example of a WAN. Any suitable architecture may be used to implement such networks, e.g., client/server or peer-to-peer architecture. In a peer-to-peer (P2P) architecture, each node has equivalent capabilities and responsibilities. This differs from client/server architectures, in which some nodes are dedicated to serving the others.

Each processor unit 104 may operate by executing coded instructions 122. The coded instructions 122 may be broken down into a set of tasks. Many processing tasks that are to be executed by the local processor node 102 (or a processor unit 104 within the local processor node 102) may be further broken down into interdependent sub-tasks. The sub-tasks may be executed in parallel. The coded instructions 122 may include a distributed scheduler distributes the sub-tasks amongst multiple processors that are accessible to the local node 102. The distributed scheduler may be implemented in hardware, software, firmware or some combination of two or more of these. A key task for the distributed scheduler is to determine whether and how to distribute the sub-tasks amongst available processing resources.

The determination of the number of nodes x may be based on a vector of resource quantities that describes both resource availability and the characteristics of the request. Such a vector may include parameters such as processor cycles, memory space, storage (e.g., hard disk) space and network bandwidth required to process the task. Estimates for the availability of distributed nodes may be made by middleware. Instantaneous, average, and expected utilization may be taken into account. Applications may make rough estimates of resources required by its tasks.

The flow diagram of FIG. 2 illustrates one method 200 among others for distributing processing tasks. Parameters relating to the vector of resource quantities may be collected as indicated at block 202. For example, the code 122 may include a resource overlay routine that runs in the background of an application and collects information on parameters relevant to determining whether and how to distribute processing tasks. Such parameters may include, but are not limited to execution times of tasks on a given node, size of data to be divided among sub-tasks, size of code or data needed by every sub-task, size of output data produced by a task, outgoing and incoming bandwidths for one or more nodes, round-trip message times to distributed nodes, processor availability, processor usage.

The parameters may optionally be stored at block 204 in a parameter table 205, which may be stored in a memory accessible by the local node 102. For example the parameter table 205 may be part of a database DB stored in the main memory 106 of the local node 102. The parameter table 205 may be updated from time to time as conditions change while waiting for new tasks. When the local processor node 102 generates a new task, as indicated at block 206, a determination is made whether or not to distribute processing of the task. Specifically, the task may be divided into one or more sub-tasks, as indicated at block 208. An optimum number of nodes x on which to process the one or more sub-tasks may then be determined, as indicated at block 210. The number of nodes x may be based at least partly on parameters relating to processing the sub-tasks at nodes accessible by the local node, e.g., parameters stored in the parameter table 205. It is noted that many tasks may involve multiple sub-tasks of the same kind, e.g., same input data and code. It is also noted that the resources and parameters may change over time. Thus it may be useful to return to block 202 to re-collect the parameters. This can provide a check as to whether the resources and/or parameters have changed before determining at block 210 the optimum number of nodes x for the next sub-task of the same kind.

Based on the value of x, a determination may be made at block 212 whether to process the task at the local node 104 or distribute the task to one or more distributed nodes accessible by the local node. Where distribution does not make sense, e.g., where x=1, local processing is faster and local processing resources are available, the task may be processed locally, as indicated at block 214.

If at block 212 it is determined that distribution makes sense, e.g., if x>1 and/or other criteria are satisfied, the tasks (or sub-tasks) may be allocated for processing at one or more distributed nodes. The nature of the distribution may depend on the value of x and the number of nodes available. For example, if x nodes are available the task (or sub-tasks) may be sent to x distributed nodes for processing, as indicated at block 216. If fewer than x nodes are available the task may be split to available nodes, as indicated at block 218. For example, suppose it is determined that x=20 nodes are optimal for processing a particular task and only ten are available. In such a case, the task may be split into two portions. Half of the work may be assigned to the ten available nodes and the remainder may be assigned to other nodes as they become available.

Determining whether and how to distribute tasks often depends on the bandwidth available for transmission of data to a distributed node. The available bandwidth may depend on the nature of the data transmission path. For example, each of the data busses 108, 112, 114 and the networks 120 connected to the local node 104 may have different bandwidths. As used herein, the term bandwidth generally refers to a rate of transfer of information in a given amount of time. Bandwidths for digital data are typically expressed in a number of bits or bytes per second. By way of example, in a cell processor, the bandwidth for data transfers between the SPUs may be as high as about 100 gigabytes per second (GByte/s). Bandwidth for data transfers from an SPU to the memory 106 may be as high as about 20 GByte/s. Data transfers between cells over a "blade" may have a bandwidth of about 30 GByte/s. The local bus 112, e.g., PCIE, may have a bandwidth of 20 GByte/s. LAN bandwidths may range from about 10 megabytes per second (MByte/s) to about 10 GByte/s. Bandwidths for a WAN, such as the Internet, may range from about 128 kilobytes per second (KByte/s) to about 10 MByte/s.

The determination of whether to distribute tasks at block 212 and how to distribute tasks at block 216 may also depend on the type of task involved. Many different types of data processing tasks and sub-tasks may be implemented by distributed computing according to embodiments of the present invention. Each sub-tasks may be characterized by a sub-task type that distinguishes one type of sub-task from another and/or provides information for determining the optimum number of nodes x and or how to distribute the task or sub-task amongst accessible nodes. Such task and sub-task types include, but are not limited to Complex start-to-finish tasks, Divisible-by-N tasks, Intercommunicative persistent tasks, and Stateless persistent tasks or services.

In Complex start-to-finish tasks a static task file describes how tasks depend on each other and their required data/code. An optimal number of processors may be statically determined from the task file. One option for doing this is to statically determine an optimal distribution of tasks. Another option is to dynamically execute tasks by treating the allocated processors as a thread pool. As processors finish tasks, they notify a task master and wait for the next task. Code and data resources may be pre-fetched, e.g., if the size in bytes is known, and the destination node's bandwidth is known. In the absence of an estimate of the execution time of each sub-task, pre-fetching may be done for all sub-tasks at a start time for the task.

Divisible-by-N tasks are tasks that can be divided up as much as there are available resources. Equations for the optimal number of nodes N to use for executing such tasks may be derived if the one-node-execution-time is known for the task. Factors such as bandwidth and distribution method (linear/server vs. logarithmic/P2P) may be taken into account in the equation. Divisible-by-N tasks may fall into a number of different task types. For example, in one type of task, the same data is sent to all nodes. Ray tracing tasks are an example of this task type. In another task type a piece of data sent to each node. The SETI (search for extra-terrestrial intelligence) project is an example of this task type. In divisible-by-N tasks, each allocated task is initialized with its unique index in the range of ( 0,N) and N is the actual number of allocated processors. The required data for each task is distributed in some suitable manner. Note that parallel sub-tasks of complex hierarchical tasks might fit into this category.

In intercommunicative persistent tasks (sometimes also referred to as persistent interactive tasks) as many processors as there are tasks are allocated. The tasks begin executing and communicating freely. Complex hierarchical tasks may execute in this environment by pre-allocating all sub-tasks and passing messages to progress through the execution stages. As long as parallel tasks are allocated to different nodes/processors, the same (if not better) performance may be achieved. Servers and game objects are a few examples, among others, of intercommunicative persistent tasks.

Stateless persistent tasks or services are global functions that have inputs and outputs, but no state. Such tasks are generic, so they may be redundantly duplicated on multiple nodes to load balance. Stateless persistent tasks may be executed on any available node. Certain distributed scheduling implications are present with this type of task. For example, in determining at block 210 how many nodes x to distribute the task to and/or how to distribute the task at blocks 216, 218, it may be useful to know how the task spawns new copies when it gets overloaded. In addition, factors such as usage percent and locality may be useful for determining how to distribute the task at blocks 216, 218.

Processing tasks, including those listed above, may be further categorized into one of two categories: one time tasks and persistent tasks. One-time tasks use all or nearly all resources of a processor for some amount of time, which may be estimated by the application. Persistent tasks, by contrast, use on average less than all resources of a processor for an unknown amount of time. Persistent tasks may be characterized by bursty processor usage, which is often based on message traffic.

Appropriate distribution of sub-tasks may utilize unused processor resources throughout a WAN, such as the Internet. Such use of available resources may be implemented, e.g., within the context of computer gaming to enhance a game experience, serve shared-space objects, trans-code media streams, or serve a game in the traditional client-server model. Designing a deployable framework that can support these use cases is a non-trivial task. For example, it is desirable for such a framework to be scalable, decentralized, secure, cheat-proof, and economically sound. Unfortunately, there are some common problems with existing distributed computing frameworks. Most such frameworks utilize a centralized core or are designed for "infinite workpile" tasks such as the search for extra-terrestrial intelligence (SETI).

Execution time estimates (and other resource usage estimates) may be required in order to determine the number of processor nodes x at block 210 and to determine if a particular task should be allocated locally, on a local are network (LAN), or on a wide area network (WAN), e.g., at block 216. Precise automatic estimates may be difficult, if not impossible, to obtain. Run-time averages and/or static code analysis may generally only be useful for determining the execution time of constant-time algorithms (O(c)). In addition, computationally-intensive tasks that are suitable for parallel execution are not often composed of constant-time algorithms and are more often composed of variable-length algorithms. The execution time of such variable-length algorithms may depend on input-parameter values which are not available until run-time. The execution-time of a given function may be predicted by a second function that computes resource requirements based on input-parameters. However, the second function may cause a significant amount of overhead, because it would have to be executed many times during run-time for every new set of parameters to a function. The efficiency of the distributed computing depends roughly on the accuracy of the processor-usage estimates.

In embodiments of the present invention it may also be desirable to consider other measures of available processor power when determining when and how to distribute multiple tasks or sub-tasks at blocks 212-216. For one-time tasks, the execution time may be a useful measure when determining available processing power in a homogeneous computing environment. In a heterogeneous environment, the number of cycles would be more useful. For persistent tasks, it may be more useful to know the percentage of CPU usage over time (or cycles per second in a heterogeneous environment). Therefore, the processor usage value may have to be interpreted alongside the task type.

A significant threshold question at block 212 is whether to distribute processing tasks or not to distribute it. Many tasks may be visualized as a group of two or more interdependent sub-tasks. Often, some of the sub-tasks may be executed in parallel. Given several available options for processing a particular task it is useful for a distributed scheduler to decide whether the sub-tasks should be (1) executed on a single local node processors, (2) distributed among multiple local node processors, (3) distributed on a LAN, (4) distributed on a WAN, or (5) distributed in some other way. There is a sliding scale from local node to LAN to WAN. A number of factors may be used to help determine where a particular task lies on this scale.

One factor that may be considered in determining whether to distribute at block 212 is the execution time for each parallel sub-task. The execution time for each parallel sub-task refers to the time it takes to execute each sub-task on a single processor of a given type. The execution time generally depends on the nature of the sub-task and the type of processor used to execute the sub-task. If each parallel sub-task has a long execution time it may be more appropriate to distribute such sub-tasks over a WAN. By contrast, short execution time sub-tasks may be more suitable for distribution amongst processors available at a local node.

Another factor to consider is the number of sub-tasks to be executed. If there are a large number of sub-tasks it may be more appropriate to distribute them over a WAN. If there are only a few (particularly with short execution times) it may be more appropriate to distribute them to processors available at a local node.

An additional factor to consider is the amount of synchronous interaction between the parallel sub-tasks. As used herein, synchronous interaction generally refers to a blocking communication between the sub-tasks. For example, a first task may send a message to second task and wait for a reply from the second task before continuing any computation. If there is a significant amount of synchronous interaction between parallel sub-tasks it may be more appropriate to distribute the parallel sub-tasks over processors available at a local node. If there is a relatively small amount of synchronous interaction between parallel sub-tasks (or none at all) it may be more appropriate to distribute the parallel sub-tasks over a WAN. A number of factors may determine whether a given amount of synchronous interaction is "significant" or "relatively small". For example, synchronous interaction may be significant if sub-tasks are spending more time waiting for synchronous replies from other sub-tasks than they are spending on computation, performance may be enhanced by reducing the communication latency between them. Communication latency may be reduced, e.g., by distributing the sub-tasks over a LAN instead of a WAN or over a local node instead of a LAN.

Yet another factor to consider is the amount of data needed for each sub-task, e.g., the size of input data and/or binary code to be utilized by the sub-task. Where each sub-task requires a significant amount of data it may be more appropriate to distribute the parallel sub-tasks amongst processors at a local node. Where each sub-tasks requires relatively little data it may be more appropriate to distribute the sub-tasks over a WAN.

To determine the number of nodes x at block 210 and/or distribute the tasks or sub-tasks at blocks 216, 218 it is often desirable to obtain estimates for task execution times and data requirements n order to assure better performance through distributed computing. Without such estimates, distributed computation may degrade the performance of a task (compared to executing the task locally).

According to embodiments of the present invention, equations may be derived to determine an optimal number of nodes x on which to execute a given task at block 210 for many types of parallel computing tasks. Derivation of such equations may involve determining an effective execution time (EET) in terms of the number of processor nodes (x). The equations may also consider additional variables, including:

ET: representing the execution time of all tasks on one node.

TS: representing a total size of data which is divided among sub-tasks.

CS: representing a constant sized data needed by every sub-task (ex: code size).

RS: representing a total size of output data produced by the tasks.

$BW_o$, $BW_i$: respectively representing outgoing and incoming bandwidths for all processor nodes.

RTT: representing a round-trip message time to processor node.

These quantities may be obtained as part of the collection of parameters at block 202 and may be stored in the parameter table 205.

According to an embodiment of the invention, the effective execution time EET in terms of number of processor nodes x may be approximated by:

$$EET \approx \frac{f(x, TS, CS)}{BW_o} + \frac{ET}{x} + \frac{RS}{BW_i} + RTT \quad \text{Equation 1}$$

The first term on the right hand side of Equation 1 represents the time it takes for all processor nodes to receive the data needed to start execution. The second term represents the time required to execute a single sub-task. The third term represents the time required to send the results of the sub-tasks back to the source.

By way of example, the expression f(x, TS, CS) in the first term of Equation 1 may be a distribution metric that calculates how much data is sent serially before every processor node begins executing. Data may be distributed either linearly ($f_1$), where the source node sends the data to all processor nodes, or logarithmically ($f_2$), where the source node is the root of a binary distribution tree. The expression f(x, TS, CS) may take on the form $$f_1 = CS \cdot x + TS \quad \text{Equation 2}$$

if the data is distributed linearly. Alternatively, the expression f(x, TS, CS) may take on the form:

$$f_2 = CS \cdot \log_2 x + 2TS + \frac{TS - 2TS \cdot \log_2 x}{x} - \frac{2TS}{x^2} \quad \text{Equation 3}$$

if the data is distributed logarithmically.

According to embodiments of the present invention the expression f(x, TS, CS) may preferably be in the form of a function $f_h$ that is a hybrid of the linear form $f_1$ of Equation 2 and the logarithmic form $f_2$ of Equation 3. It is generally more efficient to send out TS data (which is divided among all processor nodes) linearly. Furthermore, it is usually more efficient to send out the CS data logarithmically. The $f_2$ equation sends the entire CS data each step. The timing may be improved if an infinitesimally small piece of CS data is sent each step. Then, the time it takes to distribute the entire amount of data becomes limited mostly by the RTT. The hybrid distribution function $f_h$ may take on the form:

$$f_h(h) = \begin{cases} CS + TS + BW_o RTT \cdot \log_2(x+1) & TS \leq CS \\ \max(CS + TS, 2CS + BW_o RTT \cdot \log_2(x+1)) \end{cases} \quad \text{Equation 4}$$

When TS<CS, it is most efficient to have the source node help distribute the CS data logarithmically, and when that is complete, divide and send out TS data to all peers. When TS>CS, it is more efficient to distribute CS and TS data in parallel. The max function in the lower expression on the right hand side of Equation 4 above describes the parallel process of sending the CS out logarithmically and the TS out linearly. The max function returns the maximum of CS+TS and 2CS+ $BW_o RTT \cdot \log_2(x+1)$. The execution phase cannot start until both CS and TS data is received by processor nodes—hence the use of the max function.

As an example, consider a distributed ray-tracing task, where all nodes need the same scene data. CS is large, and TS is effectively zero, so the equation for EET is:

$$EET \approx \frac{CS}{BW_o} + RTT \log_2\left(+\frac{ET}{x}\right) + \frac{RS}{BW_i} + RTT \quad \text{Equation 5}$$

To find an equation for the optimal number of nodes on which to execute the task one may calculate the number of nodes X for which EET is the smallest). To determine this value of X, one may take a derivative of Equation 5 for EET with respect to x, and then find the value of x for which EET'=0.

$$EET' \approx \frac{RTT}{x \cdot \log 2} - \frac{ET}{x^2} = 0 \quad \text{Equation 6}$$

Which yields:

$$x \approx \frac{ET \cdot \log 2}{RTT} \quad \text{Equation 7}$$

For realistic tasks, there may be a maximum possible number of task subdivisions. However, if the computed optimal number of execution nodes ends up being greater than the maximum possible subdivisions, the scheduler can simply allocate the maximum. Based on these results, small, equal-length, equal-size tasks are best suited for distributed computing. This is because the scheduler can determine the optimal number of nodes based on the total execution time and total data size, and then distribute the small tasks evenly among the chosen processor nodes.

Determining the optimum number of nodes x at block 210 and/or determining whether to distribute at block 212 and/or determining the allocation of tasks or sub-tasks to distributed nodes at block 216 may involve consideration of additional metrics beyond the parameters discussed above. For example, such additional metrics include determining a cost of processing the sub-tasks. Determining the cost may involve determining a cost per node for executing the tasks on x nodes. The cost per node may depend on a number of factors, including amounts of bandwidth and/or execution time used on each distributed node. In addition the cost per node may depend on the cost per node is based on one or more of the number of nodes x, a desired quality of service, an amount of constant sized data, a cost of transmission and a cost of usage. All these factors may be taken into account when taking the cost of distributed processing into account.

Figure 3:
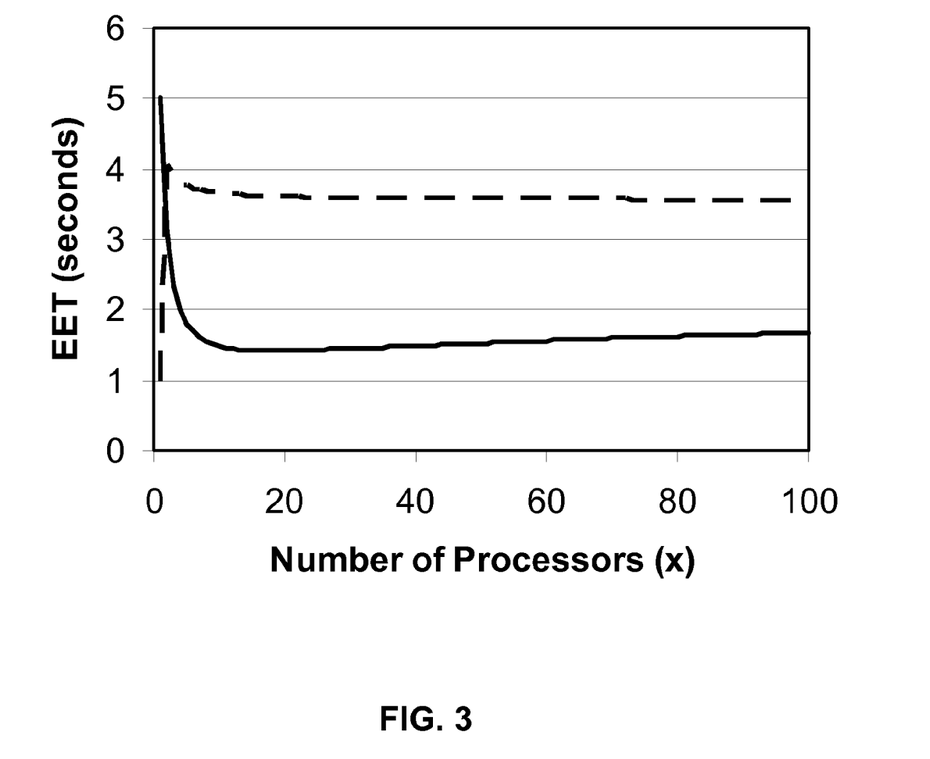
FIG. 3 is a graph depicting plots of effective execution time versus number of processors for determination of whether or not to distribute a task according to an embodiment of the present invention.

FIG. 3 illustrates numerical examples of whether to distribute or not to distribute. Specifically, the solid plot in FIG. 3 depicts a graph of EET versus x for the following values of parameters:

ET=5 seconds
TS=1 KByte
CS=1 KByte
RS=10 KBytes
$BW_o$=30 KBytes/s
$BW_i$=400 KBytes/s.
RTT=0.2 seconds.

As can be seen from the solid plot in FIG. 3, the processing time for x=1 processor is 5 seconds and a minimum EET of about 1.4 seconds is obtained for distributed processing using x=17 processors. In this example, based on the significantly shorter EET for 17 processors it makes sense to distribute.

The dashed plot in FIG. 3 depicts a graph of EET versus x for the following values of parameters:

ET=5 seconds
TS=100 KBytes
CS=0 KByte
RS=10 KBytes
$BW_o$=30 KBytes/s
$BW_i$=400 KBytes/s.
RTT=0.2 seconds.

As can be seen from the dashed plot in FIG. 3, the processing time for x=1 processor is 1 second the minimum EET. Even on 100 nodes, the next best EET value is 3.5 seconds. In this example, based on the significantly longer EET for any number of processors greater than 1 it makes sense not to distribute the task.

Figure 4:
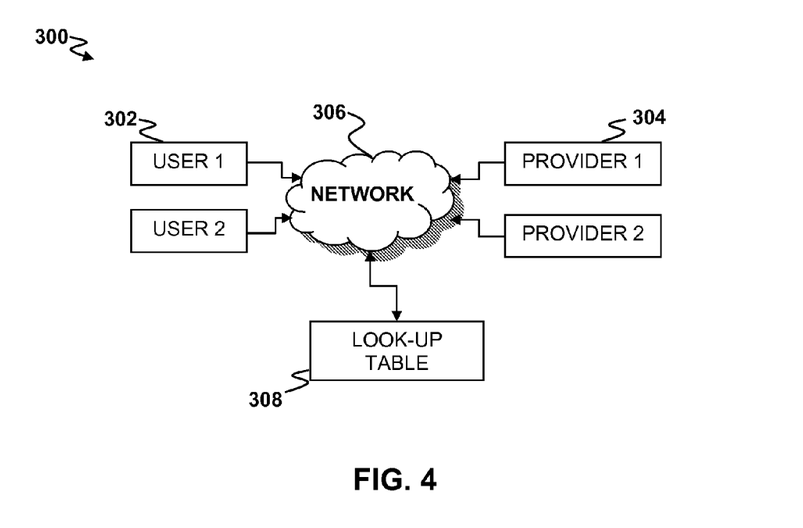
FIG. 4 is a block diagram depicting distributed processing cost determination using a look-up table model according to an embodiment of the present invention.

It is possible that costs for distributed processing may vary based on who is providing the resources for processing. Owners of such resources may reasonably be expected to be compensated for making them available. The amount of such compensation may vary from provider to provider. Thus, it is useful for users of distributed processing resources to be able to determine the cost of using such resources. FIG. 4 depicts one possible model 300 for determining the costs of using remotely distributed resources. In the model 300 user nodes 302 and provider nodes 304 are connected over a network 306. Owners of the provider nodes 304 may post their available resources and corresponding costs on a look-up table 308 that is accessible over the network 306. By way of example, the look-up table 308 may be stored in the memory of a node connected to the network 306. The user nodes 302 may find out what processing resources available and for what cost by consulting the look-up table 308.

Figure 5:
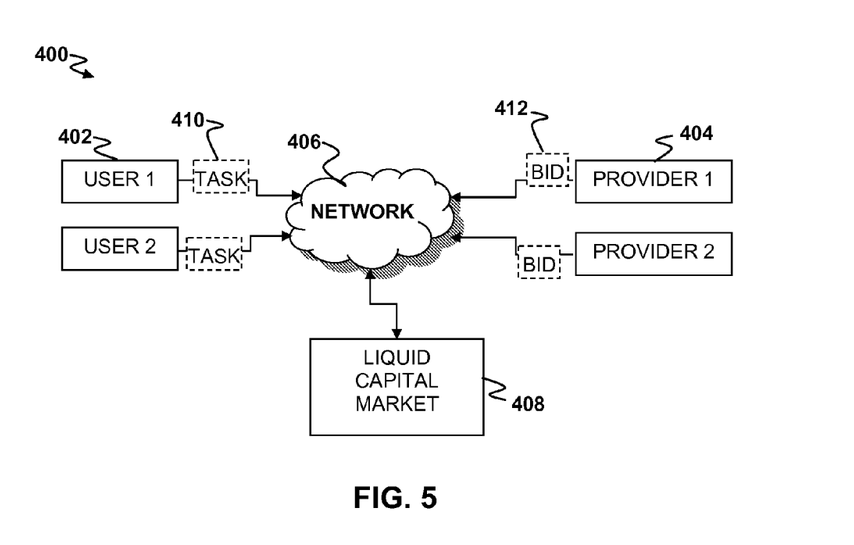
FIG. 5 is a block diagram depicting distributed processing cost determination using a liquid capital market model according to an embodiment of the present invention.

In an alternative model 400 shown in FIG. 5, user nodes 402 and provider nodes 404 may interact via a network 406 with a liquid capital market 408. The user nodes 402 may submit task requests 410 to the liquid capital market 408 for listing. The liquid capital market 408 may list each task request 410, e.g., on a website that is accessible to other user nodes 402 and provider nodes 404. Each task request 410 may include information about a task that the user node 402 wishes to distribute amongst available providers. Such information may include various parameters discussed above. The task requests 410 may also include a price that an operator of the user node is willing to pay for use of resources on provider nodes. Such a price may be stated, e.g., in terms of currency or resources the node operator is willing to relinquish in exchange for use of the provider node's resources. Provider nodes 404 may submit bids 412 on task requests 410 listed on the liquid capital market 408. User node operators and provider node operators may then come to an agreement on resources to be provided and the price for those resources through a process of open and competitive bidding.

In alternative embodiments consideration of additional metrics may involve determining whether a proposed distribution of sub-processing tasks is consistent with one or more user defined policies. For example, if a user wants to execute sub-tasks only in the state of California, then this user defined policy may be applied to a resource selection metric to cull resources provided from other states.

Additional considerations may enter into the determination of how to distribute processing tasks at blocks 216, 218. For example, data transmission and processing times may be greatly reduced if code and/or data needed for performing a given task or sub-tasks are already present in the cache of a distributed node. As used herein, the term cache generally refers to a region of high speed storage (e.g., static random access memory (SRAM)) associated with a particular processor or node. A cache is commonly used to store data and/or instructions that are frequently used. To facilitate distribution of tasks it may therefore be desirable to determine the contents of caches associated with one or more distributed nodes to determine if and/or data needed for processing a task or sub-task is present. Tasks and/or sub-tasks may then be preferentially distributed at block 216 or block 218 to nodes having the needed code and/or data.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for processing of processor executable tasks, comprising:

generating a task with a local node, wherein the local node includes a processor unit operably coupled to one or more distributed nodes;

dividing the task into one or more sub-tasks;

determining with the processor unit an optimum number of nodes x on which to process the one or more sub-tasks, wherein x is based at least partly on parameters relating to processing the sub-tasks at nodes accessible by the local node, wherein determining the optimum number of nodes x is based on a minimum effective execution time (EET) for the task, wherein the LET is calculated by a formula of the type:

$$EET \approx \frac{f(x, TS, CS)}{BW_o} + \frac{ET}{x} + \frac{RS}{BW_i} + RTT,$$

where ET represents an execution time of all sub-tasks on one node,

TS represents a total size of data which is divided among the sub-tasks,

CS represents a constant sized data needed by each sub-task,

RS represents a total size of output data produced by the tasks $BW_o$, $BW_i$ respectively represent outgoing and incoming bandwidths for all nodes, and RTT represents a round-trip message time from the local node to a distributed node; and based on the value of x, determining whether to process the task at the local node or distribute the task to one or more of the distributed nodes that are accessible by the local node.

2. The method of claim 1, further comprising distributing the sub-tasks to x nodes for processing.

3. The method of claim 2, further comprising retrieving output data for the sub-tasks from the x nodes.

4. The method of claim 1, further comprising collecting the parameters relating to processing the sub-tasks.

5. The method of claim 4, further comprising storing the parameters in a data storage medium that is accessible by the local processor.

6. The method of claim 4, wherein the parameters include one or more of a number of available nodes, data transfer rates between the local node and one or more distributed nodes, round trip times between the local node and one or more distributed nodes, a number processor cycles for each sub-task, an amount of memory space required for each sub-task, an amount of storage space required for each sub-tasks, and a network bandwidth available for transmitting data related to the sub-tasks.

7. The method of claim 1 wherein x is based on an execution time of all tasks on one node (ET) and a round-trip message time (RTT) from the local node to a distributed node.

8. The method of claim 7 wherein the determination of x is based on a ratio of ET to RTT.

9. The method of claim 1 wherein determining the optimum number of nodes x includes a consideration of additional metrics.

10. The method of claim 9 wherein consideration of the additional metrics include determining a cost of processing the sub-tasks.

11. The method of claim 10 wherein determining the cost of processing the sub-tasks includes determining a cost per node.

12. The method of claim 11 wherein determining the cost per node includes determining an amount of bandwidth or execution time used on each distributed node.

13. The method of claim 11 wherein determining the cost per node is based on one or more of the number of nodes x, a desired quality of service, an amount of constant sized data, a cost of transmission and a cost of usage.

14. The method of claim 11 wherein determining a cost of processing the sub-tasks includes obtaining a cost from a look-up table of costs from providers.

15. The method of claim 11 wherein determining a cost of processing the sub-tasks includes the use of a liquid capital market in which providers bid for customers.

16. The method of claim 9 wherein the additional metrics include one or more user defined policies.

17. The method of claim 1 wherein each sub-tasks is characterized by a sub-task type, wherein the sub-task type distinguishes one type of sub-task from another and/or provides information for determining the optimum number of nodes x.

18. The method of claim 1, further comprising determining the contents of caches associated with one or more distributed nodes.

19. The method of claim 18, further comprising preferentially distributing sub-tasks to nodes having code and/or data needed for processing the sub-task.

20. The system of claim 1 wherein the parameters include one or more of a number of available nodes, data transfer rates between the local node and one or more other nodes, round trip times between the local node and one or more other nodes, a number processor cycles for each sub-task, an amount of memory space required for each sub-task, an amount of storage space required for each sub-tasks, and a network bandwidth available for transmitting data related to the sub-tasks.

21. A system for distributing processing work amongst a plurality of distributed nodes, the system comprising:

a local node connected to the plurality of distributed nodes, wherein the local node includes one or more processor units;

processor executable instructions embodied in a processor readable medium for execution by the local node, the instructions including one or more instructions for generating a task with the local node;

one or more instructions for dividing the task into one or more sub-tasks;

one or more instructions for determining an optimum number of nodes x on which to process the one or more sub-tasks, wherein x is based at least partly on parameters relating to processing the sub-tasks at nodes accessible by the local node, wherein the one or more instructions determine x based on a minimum effective execution time (EET) calculated by a formula of the type:

$$EET \approx \frac{f(x, TS, CS)}{BW_o} + \frac{ET}{x} + \frac{RS}{BW_i} + RTT,$$

where ET represents an execution time of all tasks on one node,

TS represents a total size of data which is divided among the sub-tasks,

CS represents a constant sized data needed by each sub-task,

RS represents a total size of output data produced by the tasks $BW_0$, $BW_i$ respectively represent outgoing and incoming bandwidths for all processor nodes, and RTT represents a round-trip message time from the local node to a node accessible by the local node; and one or more instructions for determining, based on the value of x, whether to process the task at the local node or distribute the task to one or more of the distributed nodes.

22. The system of claim 21, further comprising a memory coupled to the local node.

23. The system of claim 22, further comprising information relating to the parameters stored in the memory.

24. The system of claim 21, wherein the processor executable instructions further include an instruction for collecting the parameters from the distributed nodes.

25. The system of claim 24, further comprising a memory coupled to the local node, the processor executable instructions including one or more instructions for storing the parameters in the memory.

26. The system of claim 25, wherein the processor executable instructions include one or more instructions for updating the parameters in the memory.

27. The system of claim 21 wherein x is based on an execution time of all tasks on one node (ET) and a round-trip message time (RTT) from the local node to a node accessible by the local node.

28. The system of claim 27 wherein the determination of x is based on a ratio of ET to RTT.

29. The system of claim 21 wherein x is based on one or more additional metrics.

30. The system of claim 29 wherein the additional metrics include a cost of processing the sub-tasks and/or one or more user-defined policies.

31. The system of claim 21 wherein each sub-tasks is characterized by a sub-task type, wherein the sub-task type distinguishes one type of sub-task from another and/or provides information for determining the optimum number of nodes x.

32. A processor readable storage medium having embodied therein processor executable instructions for implementing a method for processing of processor executable tasks, the instructions including:
   one or more instructions for generating a task with a local node;
   one or more instructions for dividing the task into one or more sub-tasks;
   one or more instructions for determining an optimum number of nodes x on which to process the one or more sub-tasks, wherein x is based at least partly on parameters relating to processing the sub-tasks at nodes accessible by the local node, wherein the one or more instructions determine x based on a minimum effective execution time (EET) calculated by a formula of the type:

$$EET \approx \frac{f(x, TS, CS)}{BW_o} + \frac{ET}{x} + \frac{RS}{BW_i} + RTT,$$

where ET represents an execution time of all tasks on one node,
TS represents a total size of data which is divided among the sub-tasks,
CS represents a constant sized data needed by each sub-task,
RS represents a total size of output data produced by the tasks $BW_o$, $BW_i$ respectively represent outgoing and incoming bandwidths for all processor nodes, and
RTT represents a round-trip message time from the local node to a node accessible by the local node; and
   one or more instructions for determining, based on the value of x, whether to process the task at the local node or distribute the task to one or more distributed nodes accessible by the local node.

* * * * *